Feb. 5, 1929.
P. J. WEIRICH
PRINTING PRESS DETAIL
Filed Feb. 9, 1927
1,700,917
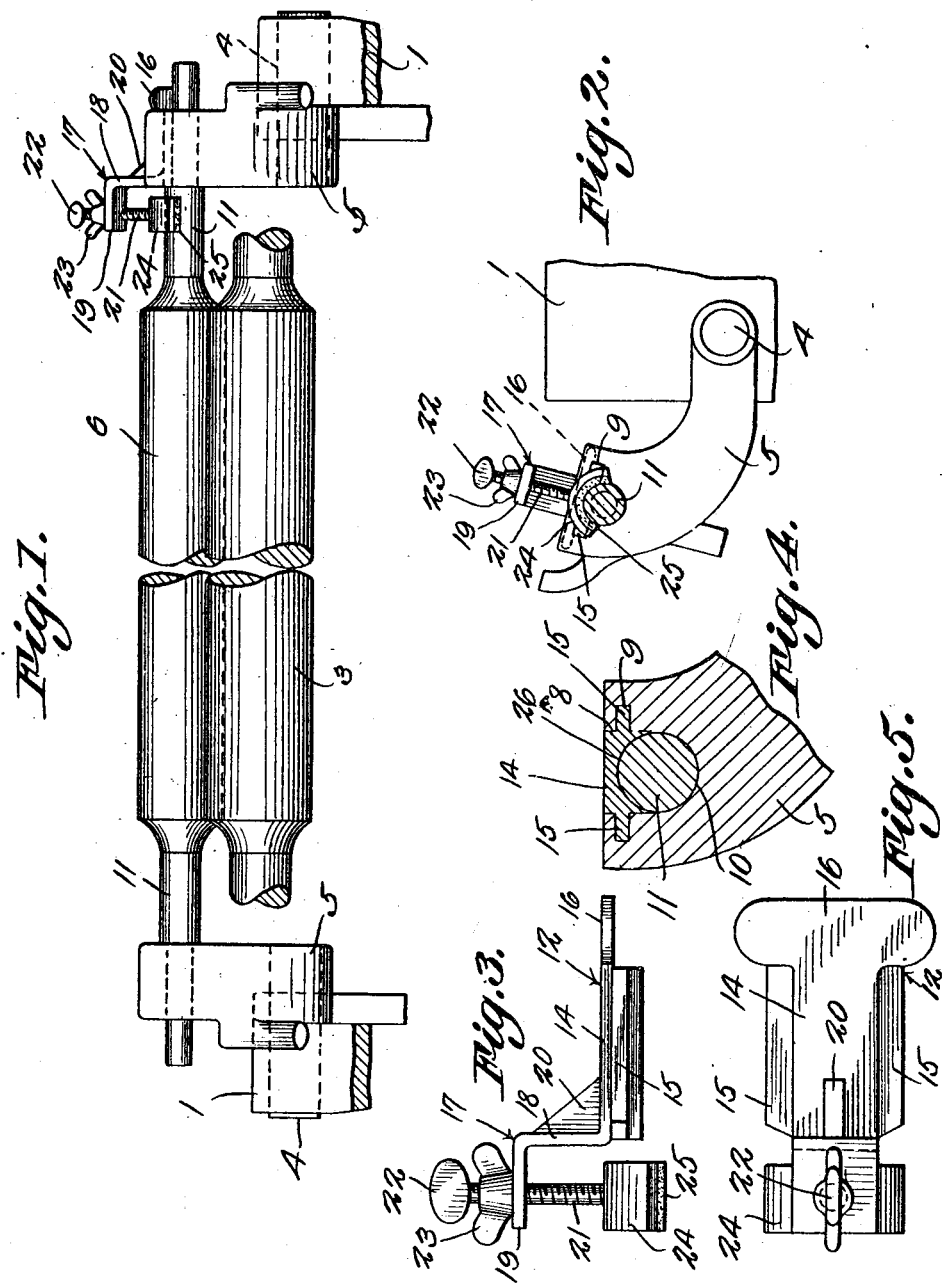

Patented Feb. 5, 1929.

1,700,917

UNITED STATES PATENT OFFICE.

PETER J. WEIRICH, OF CHICAGO, ILLINOIS.

PRINTING-PRESS DETAIL.

Application filed February 9, 1927. Serial No. 166,989.

This invention aims to provide novel means whereby the ductor roll in the inking mechanism of a printing press, will not always come into contact, at the same point, with the main distributing roll, the ink being applied more evenly, as a consequence, to the distributing roll, and impressions of different density being avoided.

It is within the province of the disclosure to improve generally and to enhance the utility of devices of that type to which the invention appertains.

Figure 1 shows in elevation, a portion of a printing press equipped with the device forming the subject matter of this application, parts being broken away;

Figure 2 is a fragmental cross section taken through a portion of the press;

Figure 3 shows in elevation, the device forming the subject matter of this application;

Figure 4 is a fragmental cross section;

Figure 5 is a top plan of the structure shown in Figure 3.

The numeral 1 indicates the frame of a printing press, the ink distributing roll being shown at 3. The usual rock shaft 4 appears in the drawing and carries arms 5 which support the ductor roll 6. The trunnions 11 of the ductor roll 6 are mounted to turn in the arms 5, and in one of the arms 5 there is a slot 8 communicating with an enlarged rectangular opening 9, below which is located the bearing seat 10 for one of the trunnions 11 of the ductor roll 6.

A bracket 12 is supplied, and includes a body 14 that is received in the slot 8 and is provided on its undersurface with a concavity 26, which, cooperating with the seat 10, forms a bearing for one trunnion 11 of the duck roll 6. The body 14 has oppositely disposed side flanges 15 which extend out laterally and fill the opening 9, so that the bracket 12 cannot move upwardly, the bracket being mounted in place by sliding it endwise, and the endwise movement of the bracket being limited by a stop 16 on the end of the bracket, which engages the arm 5. The bracket, and, more specifically, the body 14 thereof, is supplied with a standard 17 including an upright 18 disposed about at right angles to the body 14, the upright 18 having an outstanding portion 19 located approximately parallel to the body 14.

The outstanding portion 19 of the bracket carries a pressure member, which may be a screw 21 threaded into the part 19, a web 20 connecting the upright 18 with the body 14 and serving to reinforce the bracket against the thrust of the screw. The lower end of the screw 21 is swiveled in an arcuate shoe 24 having a friction facing 25, the shoe and the facing being so shaped as to fit upon the trunnion 11 of the duck roll 6. At its upper end, the screw 21 has a finger piece 22 whereby the screw may be rotated, and the screw is held in any position to which it may have been adjusted, through the instrumentality of a wing nut 23, threaded upon the screw and bearing upon the part 19 of the bracket 12.

In practical operation, the screw 21 is advanced or retracted until the shoe 24 and the facing 25 exert the proper pressure on the trunnions 11. Then, the screw 21 is held in place by seating the wing nut 23 against the part 19. It is not desirable to have the duck roll 6 spin as it moves out of contact with the ink distributing roll 3, but the duck roll 6 should rotate a little, under the conditions above mentioned, so that the duck roller 6 will not come into contact with the ink distributing roller 3, always, in the same place. The screw 21 and the lock nut 23 afford a simple means whereby a finely adjusted pressure on the duck roller trunnions 11 may be secured, the duck roller being permitted to rotate a little, as aforesaid, as and for the purpose set forth.

What is claimed is:—

1. In a device of the class described, a bracket comprising a body having lateral flanges and provided at one end with a stop, and a pressure device mounted on the other end of the bracket.

2. In a device of the class described, a bracket comprising a body having lateral flanges, the bracket being provided at one end with an upright, a pressure member adjustable in the upright, and a shoe carried by the pressure member.

3. In a device of the class described, the combination with a printing press including a duct roller and a key-way adjacent the bearing of said roller, of a brake for said roller, and a key for said key-way said brake being carried by said key.

4. In a device of the class described, the combination with a printing press including a bearing, a duct roller therein and a key-way adjacent said bearing, of a brake for said roller, and a key for said key-way serving as a mounting for said brake and a lock for said roller in said bearing.

In testimony that I claim the foregoing as my own, I have hereto affixed my signature.

PETER J. WEIRICH.